Patented June 9, 1931

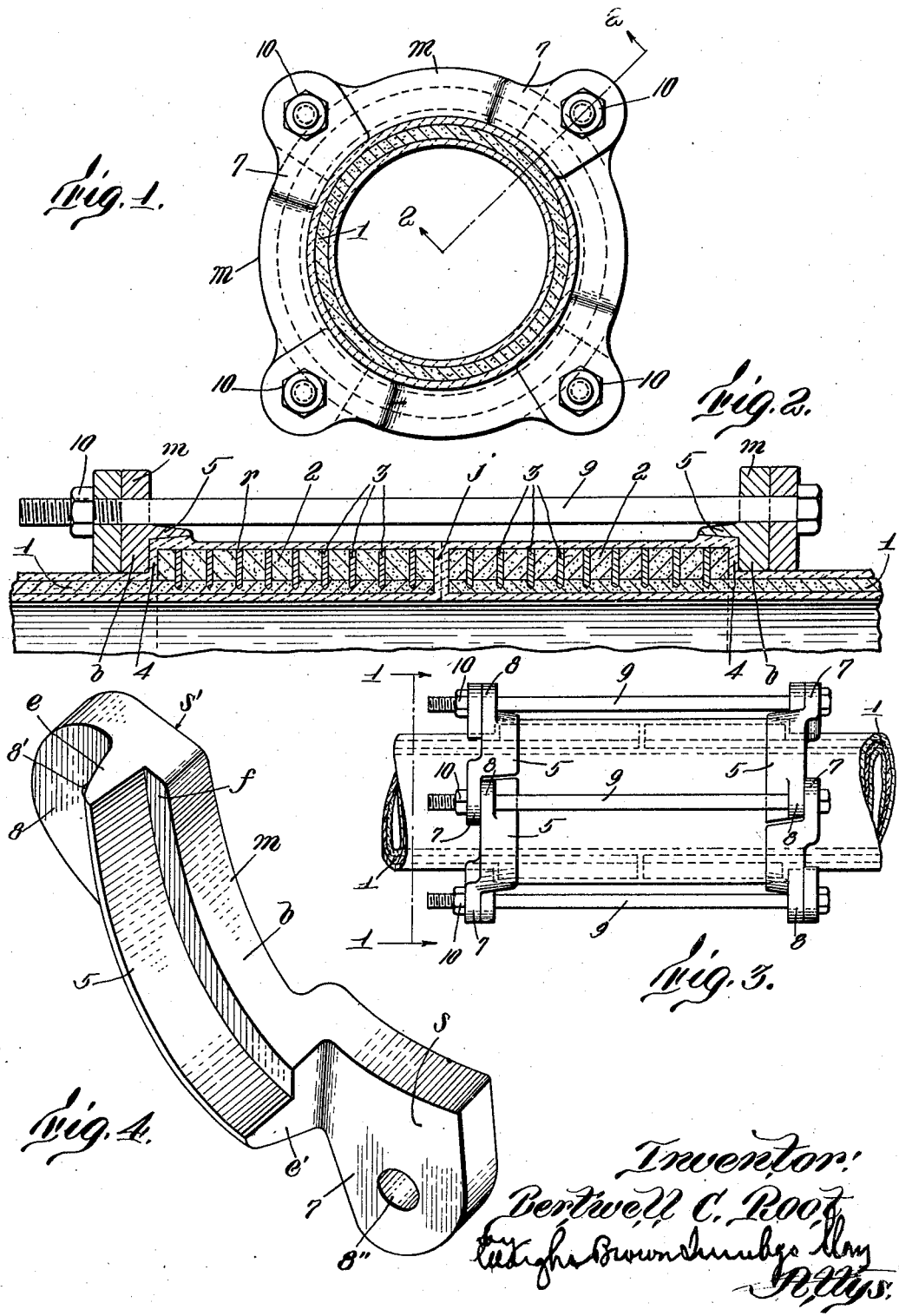

1,809,313

UNITED STATES PATENT OFFICE

BERTWELL C. ROOT, OF BERLIN, NEW HAMPSHIRE, ASSIGNOR TO BROWN COMPANY, OF BERLIN, NEW HAMPSHIRE, A CORPORATION OF MAINE

METHOD OF AND MEANS FOR JOINING CONDUITS

Application filed May 12, 1926. Serial No. 108,672.

This invention has relation to a method of and means for joining sections of conduit end to end, and more particularly tubular fibrous conduit impregnated with a thermoplastic waterproofing material, such as pitch.

Fibrous conduit sections or tubes may be made by winding a web of cellulose pulp (either kraft, ground wood, sulphite, or mixed pulp), formed on a Fourdrinier wire or other web-forming mechanism, on a mandrel until a conduit having a wall of the desired thickness has been produced, whereupon the conduit is removed from the mandrel and is dried to the desired degree. A conduit thus made is composed of a plurality of layers or convolutions of interfelted fibers, all sufficiently matted or interfelted together to constitute a substantially homogeneous wall. The dry conduit is then treated with pitch or like thermoplastic waterproofing material. By such treatment, the conduit is rendered water-resistant and it becomes sufficiently strong and rigid to withstand substantial pressure and to be machined.

In laying a conduit system as for enclosing electric cables or for conducting fluids, the conduits are joined end to end. It is the object of the present invention to provide a method and means for efficiently joining such conduits, so that not only will they be securely joined, but they will be able to withstand substantial pressure without leakage at the joints.

In accordance with the present invention, a relatively short section or collar, cut from a conduit of the proper larger diameter to produce a close fit, is externally secured to the end portion of each conduit to be joined prior to impregnation with waterproofing material. The conduit, together with the collar secured thereto, is then treated with waterproofing material in the customary manner. The ends of conduits are thus externally reinforced by the collars, which afford circumferential shoulders against which suitable clamps may be engaged for drawing together the conduits placed end to end. Upon being drawn together, the surface thermoplastic material at their ends unites and securely bonds together the ends of the conduits, resulting in a tight, non-leaking joint.

The invention may best be understood from the following more complete description thereof when considered in conjunction with the accompanying appurtenant drawings, wherein Figure 1 represents a joint made in accordance with the present invention, on the line 1—1 of Figure 3.

Figure 2 represents a line on the section 2—2 of Figure 1.

Figure 3 shows a front view of the joint.

Figure 4 illustrates in detailed perspective a clamping member.

On the accompanying drawings, 1 represents the end portion of a tubular conduit built up of convolutions of interfelted fibers sufficiently matted together to constitute a substantially homogeneous wall. A fibrous collar 2, formed by cutting a section from a tubular conduit of the proper larger size, is fitted at the end of the conduit 1, so that the corresponding ends of collar and conduit are flush, whereupon the collar is fastened in place, thus forming an end flange on the conduit section. The fastening means employed are preferably wooden pegs 3, similar to those commonly employed in pegging shoes, and may be arranged in spaced rows $r$ about the collar and conduit. By this means the collar is securely fastened to the conduit and is not liable to be loosened therefrom, even when a considerable shearing force is applied thereto. To facilitate pegging, apertures may be initially made in the collar and conduit, and the pegs may then be inserted into the apertures and driven into the unperforated material. Or, if desired, a shoe-pegging machine, which both forms the hole and drives the peg into the material, may be used. The conduit together with the collar pegged or otherwise fixed thereto is then treated with thermoplastic waterproofing material, e. g., pitch, in a manner to effect the impregnation and coating of both conduit and collar with such material. Such treatment also effects an intimate bonding between collar and conduit, so as to constitute in effect an integral structure.

Conduits thus provided with collars and treated with waterproofing material are placed end to end, as shown in Figure 2. Clamping members *m* are then positioned about the circumferential shoulders 4 afforded by the collars. Each member *m*, as shown, comprises a base *b* and an arcuate flange 5, preferably tapered, protruding therefrom. The base is provided at its ends with ears 7 and 8, having holes 8', 8'' through which fastening bolts may be passed. The bearing surface *s* of the ear 7 is on a plane sufficiently offset relative to the corresponding surface *s'* of the ear 8 so that in assembling the clamp members as shown in Figure 3, the end *e* of the flange of one member will become alined with the end *e'* of the flange of an adjacent member to form a continuous flange or ring, with the apertures 8', 8'' of adjacent members registering with one another and the surfaces *f* of the bases lying in the same plane. In the construction shown, four clamping members are used, but it is obvious that two, three, or any other suitable number may be used.

The clamping members are applied to the end portions of the conduits so that the flanges 5 and the surfaces *f* engage about the circumferential shoulders 4. Tightening bolts 9 are then passed through the apertures 8, 8' from adjacent clamping members positioned at the end of one conduit to the corresponding apertures of adjacent clamping members at the end of the other conduit, and the nuts 10 at the ends of the bolts are tightened. The ends of the conduits are thus forced into intimate contact with one another, the waterproofing material at the juncture *j* of both ends bonding together and resulting in a secure joint, which is fluid-tight under substantial pressure. If desired, although not necessary, sheet packing may be inserted between the ends of the conduits prior to their union.

By tightening the bolts, also, the surface waterproofing material at the sides of the shoulders 4 flows up and under the tapered flange 5, affording a tight fit thereat. Although a flange of uniform section may be employed, by having a tapered construction as shown, a wider avenue of escape is provided for the flowing thermoplastic material under pressure, thus tending to inhibit breaking of the shoulders. Under certain conditions, if the clamps do not fit well at the shoulders 4, heat may be applied to the waterproofing material prior to drawing the clamps together, such drawing then resulting in a flowing of the waterproofing material to the slack-fitting region from the tight-fitting portions, and the production of a perfect fit. Similarly, if desired, heat may be applied to the material at the juncture *j*, so that a material fusion of the thermoplastic may be produced, thus causing an intimate bonding of the conduit ends.

The clamp members *m* may be made of cast iron, though any other suitable material, such as wood, or pulp moulded to form and impregnated with a suitable rigidifying, strengthening and waterproofing material such as pitch, may be employed, if desired.

Conduits joined as hereinbefore described are not liable to leakage at the joints, and inasmuch as the permanent pressure provided by the clamps is exerted on a reinforced conduit end and over a larger area than if the conduit end were not reinforced, the pressure necessary for effecting a tight joint does not cause breaking or weakening of the conduits at the joint, so that the joints endure as long as the rest of the conduit. Furthermore, there is no necessity for the use of any packing material in making the joints.

While I have described this invention as being particularly applicable for joining fibrous conduits, it is obvious that the method and means described may be employed where conduits made of similar materials are to be joined.

Having thus described an embodiment of this invention, it should be obvious that it is susceptible of various changes and modifications without departing from its spirit or scope as defined by the appended claims.

What I claim is:

1. A method of preparing fibrous conduit for end joining, which comprises pegging a fibrous collar externally thereto substantially flush with its end, and then impregnating the conduit with waterproofing material.

2. A method of joining sections of fibrous conduit end to end, which comprises securing a fibrous collar externally to each end portion to be joined substantially flush with the end face thereof, thereby providing an external circumferential shoulder, treating the conduit sections with thermoplastic waterproofing material, placing said end faces together, and exerting a permanent external pressure on the shoulders toward each other, thereby causing the thermoplastic material to bond together at the juncture of the conduits and thus effecting a tight seal at the joint.

3. A method of joining sections of fibrous conduit end to end, which comprises securing a fibrous collar externally to each end portion to be joined substantially flush with the end face thereof, thereby providing an external circumferential shoulder on each said end portion, saturating the conduit with thermoplastic waterproofing material, placing a pair of conduits in end to end engagement, fusing the thermoplastic material on the end faces of the conduits, and then exerting a permanent external pressure on the shoulders toward each other to cause the thermoplastic material at the juncture of the conduits to be permanently bonded together.

4. A pair of conduits treated with thermoplastic waterproofing material and laid end to end, each of said conduits having an external collar affixed thereon flush with its end to afford a circumferential shoulder thereabout; and means for applying permanent pressure on said shoulders to bond together the ends of the conduits.

5. A pair of conduits treated with thermoplastic waterproofing material and laid end to end, each of said conduits having an external collar affixed thereon flush with its end to afford a circumferential shoulder thereabout; clamp members engaging said shoulders; and means for drawing the clamp members together to fix said conduits in assembled relation.

6. A pair of fibrous conduits treated with waterproofing material and laid end to end, each conduit having an external collar pegged thereon flush with its end to afford a circumferential shoulder thereabout; and means for applying pressure on said shoulders toward each other to maintain the conduits in assembled relation.

7. A method of joining sections of fibrous conduit end to end, which comprises placing a fibrous collar upon each end portion to be joined so that the conduit section and collar have flush end faces, securing each collar in position with fibrous pegs, saturating the conduit sections with the collars and pegs with a molten thermoplastic waterproofing compound, putting sections of conduit together with end faces of collared end portions in mutual engagement, and clamping abutting collars together whereby said end faces are held tightly together.

8. A joint of rigid fibrous conduit sections, comprising abutting end portions of said sections, a collar on each said section, wooden pegs securing each said collar in place, said collars having abutting end faces flush with the abutting end faces of said sections and opposite end faces forming shoulders about said sections, ring members fitted around said sections adjacent to said shoulders, and means for drawing said ring members together in clamping engagement with said shoulders, whereby said abutting end faces are pressed against each other.

9. A joint of rigid fibrous conduit sections, comprising abutting end portions of said sections, a fibrous collar mounted on each said end portion flush with the end thereof, wooden pegs extending through said collar and into said corresponding end portion, said collars having end faces abutting at the line of juncture and opposite end faces forming shoulders about their respective conduit sections, a thermoplastic waterproofing compound continuously permeating said sections, collars and pegs, clamping members engaging said shoulders, and means for drawing said members against said shoulders.

In testimony whereof I have affixed my signature.

BERTWELL C. ROOT.